United States Patent [19]
Matsuda et al.

[11] Patent Number: 5,835,582
[45] Date of Patent: Nov. 10, 1998

[54] TELEPHONE CALL ALERTING SYSTEM AND INFORMATION PROCESSING SYSTEM USED IN SUCH

[75] Inventors: Masahiro Matsuda; Masahiko Murakami; Masanobu Morinaga; Tadashige Iwao; Noriyuki Fukuyama; Satoshi Okuyama, all of Kawasaki, Japan

[73] Assignee: Fujitsu Limited, Kawasaki, Japan

[21] Appl. No.: 488,498

[22] Filed: Jun. 9, 1995

[30] Foreign Application Priority Data

Oct. 12, 1994 [JP] Japan .................................. 6-246479

[51] Int. Cl.[6] .................................................. H04M 13/00
[52] U.S. Cl. ........................ 379/373; 379/252; 379/375; 379/418
[58] Field of Search ..................................... 379/373, 375, 379/376, 377, 211, 205, 207, 186, 374, 160, 161, 164

[56] References Cited

U.S. PATENT DOCUMENTS

| 5,206,901 | 4/1993 | Harlow et al. ......................... 379/211 |
| 5,491,746 | 2/1996 | Pinard ..................................... 379/375 |
| 5,533,117 | 7/1996 | Kim ........................................ 379/377 |
| 5,563,932 | 10/1996 | Tachibana et al. ..................... 379/373 |
| 5,577,104 | 11/1996 | Knuth et al. ............................. 379/67 |
| 5,579,386 | 11/1996 | Koda ...................................... 379/377 |
| 5,642,413 | 6/1997 | Little ...................................... 379/373 |
| 5,649,007 | 7/1997 | Yamada .................................. 379/373 |
| 5,661,788 | 8/1997 | Chin ....................................... 379/373 |

FOREIGN PATENT DOCUMENTS

| 2 273 417 | 6/1994 | European Pat. Off. . |
| 2 274 758 | 8/1994 | European Pat. Off. . |
| 4-207245 | 7/1992 | Japan . |
| 4-368045 | 12/1992 | Japan . |
| 2273417 | 6/1994 | United Kingdom ................... 379/373 |
| 2274758 | 8/1994 | United Kingdom ................... 379/211 |

OTHER PUBLICATIONS

Bell Atlantic IQ Services "Identa Ring", Jan. 1991.
Bell Atlantic, C&P Telephone "Summary of Services" Identa Ring, Nov. 1991.

Primary Examiner—Ahmad F. Matar
Assistant Examiner—Jacques M. Saint-Surin
Attorney, Agent, or Firm—Staas & Halsey

[57] ABSTRACT

A telephone call alerting system is applied to a telephone communication system accommodating a line to which a telephone terminal is connected, a plurality of telephone numbers being assigned to the line. The telephone call alerting system includes an output unit for outputting information indicating a telephone number of a call when the call is received by the telephone terminal, a plurality of informing units for outputting an alert indicating that a call has been received by the telephone terminal, each of the plurality of informing units corresponding to one of the plurality of telephone numbers, a memory unit for storing a table indicating a relationship between the plurality of telephone numbers and the plurality of informing units, an identification unit, when the call is received by the telephone terminal, for identifying one of the plurality of informing units corresponding to the telephone number indicated by the information output by the output means, with reference to the table, and a control unit, when the call is received by said telephone terminal, for supplying an instruction of outputting the alert to the one of the plurality of informing units identified by the identification means, so that the one of the plurality of informing units outputs the alert.

23 Claims, 10 Drawing Sheets

| TEL.NO | TERMINAL ID |
|--------|-------------|
| 0123   | 100         |
| 0124   | 101         |
| 0125   | 102         |
|        |             |
| 4567   | 200         |

| TERMINAL ID | HOME USER ID | CURRENT USER ID |
|---|---|---|
| 100 | AAA | AAA |
| 101 | BBB | DDD |
| 102 | CCC | BBB |
| 200 | ZZZ | ZZZ |

| TERMINAL ID | HOME USER ID | CURRENT USER ID | GROUP TERMINAL ID |
|---|---|---|---|
| 100 | AAA | AAA | 102 |
| 101 | BBB | DDD | 102 |
| 102 | CCC | CCC | 100 |
|  |  |  |  |
| 200 | ZZZ |  |  |

FIG. 13

TELEPHONE CALL ALERTING SYSTEM AND INFORMATION PROCESSING SYSTEM USED IN SUCH

BACKGROUND OF THE INVENTION (1) Field of the Invention

The present invention generally relates to a telephone call alerting system and an information processing system used therein, and more particularly to a telephone call alerting system, in a telephone communication system in which a line connected to a telephone terminal shared by a plurality of users is accommodated, capable of accurately informing a user that a call received by the telephone terminal is for the user among the plurality of users, and an information processing system used in the telephone call alerting system.

(2) Description of the Related Art

Conventionally, in offices in which a number of telephone lines is less than a number of employees therein, a plurality of employees must share a single telephone line. In such offices having a telephone communication system accommodating analog telephone lines, an employee must speak to a person calling on the telephone terminal and ask him (her) who the call is for. In this system, an employee must answer a call on the telephone terminal every time the telephone terminal receives a call. In a case where the employee who answers the call on the telephone terminal differs from a person for whom the call is intended, although the call was not intended for the employee, the employee must interrupt his work to be on the telephone terminal.

On the other hand, in a case of a telephone communication system accommodating ISDN lines, a plurality of telephone terminals to which different telephone numbers are assigned can be connected to each line. In this system, each telephone terminal can determine, using a dial-inward dialing function, for which telephone number a call is received. However, a complex structure is needed for the dial-inward dialing function.

SUMMARY OF THE INVENTION

Accordingly, a general object of the present invention is to provide a novel and useful telephone call alerting system in which the disadvantages of the aforementioned prior art are eliminated and to provide an information processing system used in the telephone call alerting system.

A specific object of the present invention is to provide a telephone call alerting system, having a simple structure, by which a response to a call can be speedily performed.

The above object of the present invention is achieved by a telephone call alerting system applied to a telephone communication system accommodating a line to which a telephone terminal is connected, a plurality of telephone numbers being assigned to the line, the telephone call alerting system comprising: output means for outputting information indicating a telephone number of a call when the call is received by the telephone terminal; a plurality of informing units for outputting calling alerts each of which indicates that a call has been received by the telephone terminal, each of the plurality of informing units corresponding to one of the plurality of telephone numbers; table storage means for storing a table indicating a relationship between the plurality of telephone numbers and the plurality of informing units; identification means, when the call is received by the telephone terminal, for identifying one of the plurality of informing units corresponding to the telephone number indicated by the information output by the output means, with reference to the table stored in the table storage means; and control means, when the call is received by the telephone terminal, for supplying an instruction of outputting an alert to the one of the plurality of informing units identified by the identification means, so that the one of the plurality of informing units outputs the alert.

The above object of the present invention is also achieved by a telephone call alerting system applied to a telephone communication system accommodating a plurality of lines to each of which a telephone terminal is connected, and using an information processing system having a host and terminal units connected to the host, each of the terminal units being assigned to one of telephone numbers assigned to the plurality of lines including at least one line to which a plurality of telephone numbers are assigned, the telephone call alerting system comprising: output means for outputting information indicating a telephone number of a call when the call is received by a telephone terminal; table storage means for storing a first table indicating a relationship between the telephone numbers and the terminal units and a second table indicating a relationship between the terminal units and users who normally use the terminal units; current user setting means for setting information indicating users who currently use the terminal units; identification means for identifying a terminal unit corresponding to the telephone number indicated by the information output by the output means with reference to the first table stored in the table storage means; user determination means, when the call is received by the telephone terminal, for determining, based on the second table stored in the table storage means and information set by the current user setting means, whether or not a current user of the terminal unit identified by the identification means is a user who normally uses the terminal unit; first control means, when the user determination unit determines that the current user of the terminal unit identified by the identification means is the user who normally uses the terminal, for supplying to the terminal unit an instruction of outputting an alert indicating that the call has been received by the telephone terminal.

According to the present invention, since the alert is output by an informing unit (or a terminal unit) to which a telephone number of the call is assigned, it can be determined, based on the alert, whom the call received by the telephone terminal is for. Thus, a response to a call can be speedily performed.

In recent years, information processing systems into which terminal units such as work stations are integrated have been provided in offices. In such offices (e.g. offices in which software is developed), terminal units are given to respective employees.

From this point of view, another object of the present invention is to provide an information processing system which is used for the telephone call alerting system.

The above object of the present invention is achieved by an information processing system used in a telephone call alerting system applied to a telephone communication system accommodating a plurality of lines to which telephone terminals are connected, the telephone call alerting system having output means for outputting information indicating a telephone number of a call when the call is received by a telephone terminal, the information processing system comprising: a host; and terminal units connected to the host, each of the terminal units being assigned to one of the telephone numbers assigned to the plurality of lines, wherein the host has: table storage means for storing a table indicating a relationship between the telephone numbers and the terminal units; identification means for receiving the information indicating the telephone number from the output means of the telephone call alerting system and for identifying a terminal unit corresponding to the telephone number indicated by the information with reference to the table stored in the table storage means; and control means, when a call is received by the telephone terminal, for supplying to the terminal unit identified by the identification means an instruction of outputting an alert indicating that the call has been received by the telephone terminal.

The above object of the present invention is achieved by an information processing system used in a telephone call alerting system applied to a telephone communication system accommodating a plurality of lines to which telephone terminals are connected, the telephone call alerting system having output means for outputting information indicating a telephone number of a call when the call is received by a telephone terminal, the information processing system comprising: a host; and terminal units connected to the host, each of the terminal units being assigned to one of the telephone numbers assigned to the plurality of lines, wherein the host has: table storage means for storing a first table indicating a relationship between the telephone numbers and the terminal units and a second table indicating a relationship between the terminal units and users who normally use the terminal units; current-user setting means for setting information indicating users who currently use the terminal units; identification means for identifying a terminal unit corresponding to the telephone number indicated by the information output by the output means with reference to the first table stored in the table storage means; user determination means, when the call is received by the telephone terminal, for determining, based on the second table stored in the table storage means and the information set by the current user setting means, whether or not a current user of the terminal unit identified by the identification means is a user who normally uses the terminal unit; first control means, when the user determination unit determines that the current user of the terminal unit identified by the identification means is the user who normally uses the terminal, for supplying to the terminal unit an instruction of outputting an alert indicating that the call has been received by the telephone terminal.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

A description will now be given of a telephone call alerting system according to a first embodiment of the present invention.

Figure 1:
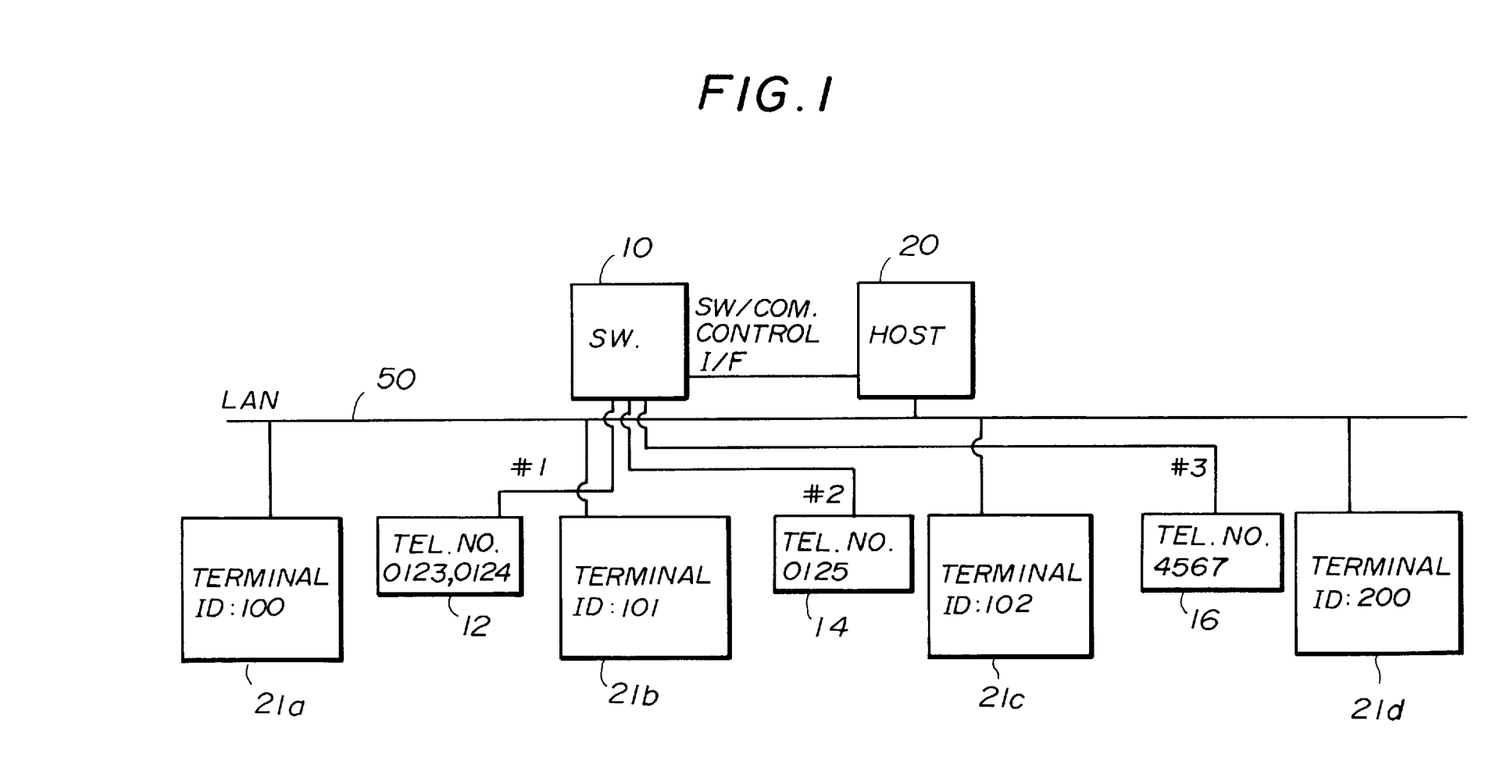
FIG. 1 is block diagram illustrating a telephone call alerting system according to an embodiment of the present invention.

A telephone call alerting system is formed in a telephone communication system and an information processing system, as shown in FIG. 1. Referring to FIG. 1, the telephone communication system has a switching unit 10 and a plurality of terminal units 12, 14 and 16. The switching unit 10 accommodates a plurality of lines #1, #2 and #3 and the terminal units 12, 14 and 16 are respectively coupled to the lines #1, #2 and #3. Two telephone numbers "0123" and "0124" are assigned to the line #1, a telephone number "0125" is assigned to the line #2 and a telephone number "4567" is assigned to the line #3.

Figure 2:
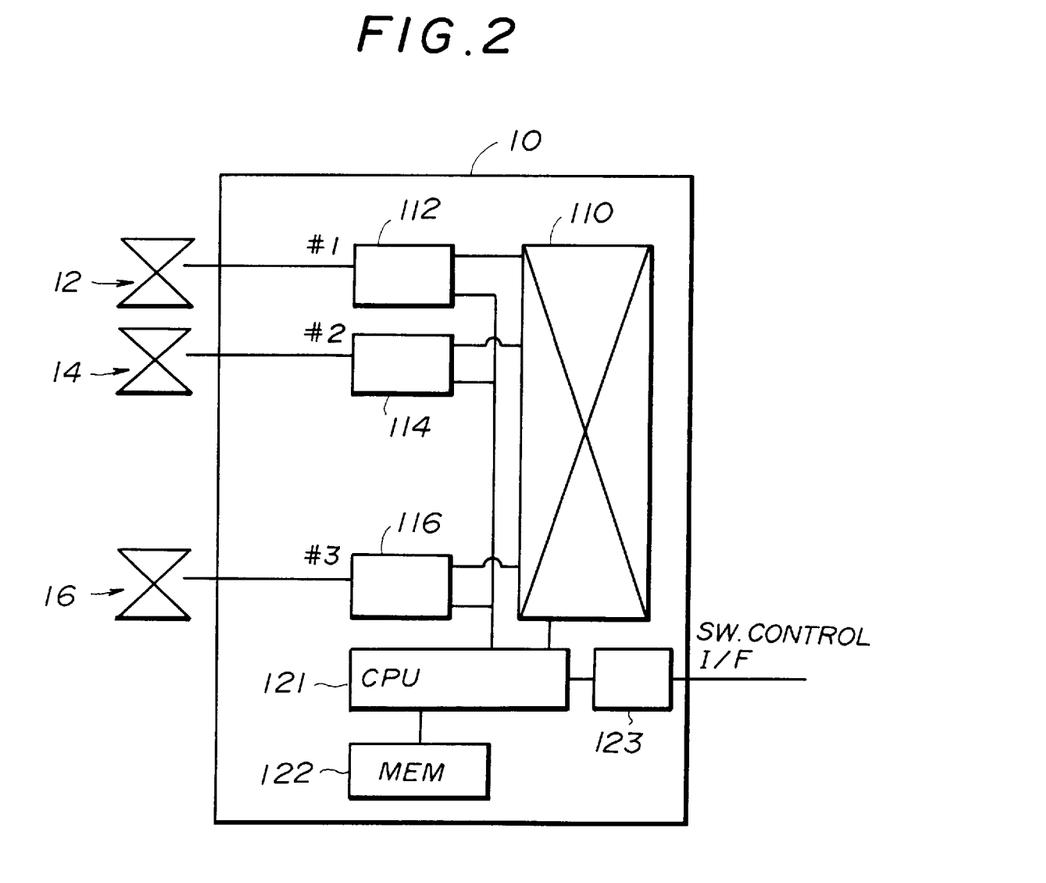
FIG. 2 is a block diagram illustrating a switching unit provided in the telephone call alerting system shown in FIG. 1.

The switching unit 10 is formed, for example, as shown in FIG. 2. Referring to FIG. 2, the switching unit 10 has a switch 110, subscriber circuits 112, 114 and 116, a controller (CPU) 121, a memory unit 122 and a calculation controller 123. The lines #1, #2 and #3 are respectively connected via the subscriber circuits 112, 114 and 116 to the switch 110. The switch 110 carries out a switching operation for the respective lines. The controller 121 controls the switch 110, the subscriber circuits 112, 114 and 116, the memory unit 122 and the calculation controller 123. The memory unit 122 stores a control table indicating a relationship between the lines and telephone numbers assigned thereto (see Table-1).

TABLE 1

| 0123 | #1 |
|------|----|
| 0124 | #1 |
| 0125 | #2 |
| ... |    |
| 4567 | #3 |

Figure 3:
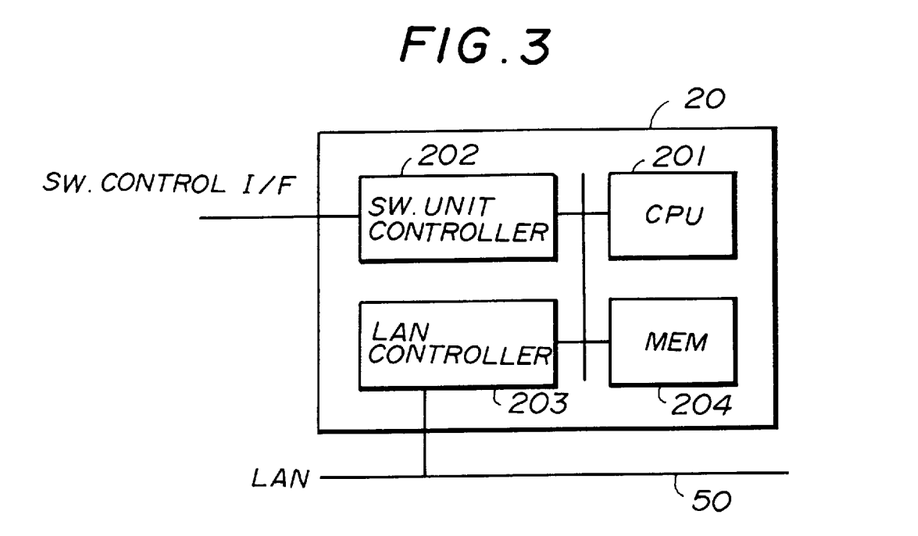
FIG. 3 is a block diagram illustrating a host unit provided in the telephone call alerting system shown in FIG. 1.

The information processing system has a host unit 20 and a plurality of terminal units 21a, 21b, 21c and 21d. The host unit 20 and the respective terminal units 21a, 21b, 21c and 21d are connected to each other by a LAN (Local Area Network) 50. The host unit 20 and the switching unit 10 are connected by a standard switch unit/computer interface, such as a CSTA. The host unit 20 is formed, for example, as shown in FIG. 3. Referring FIG. 3, the host unit 20 has a controller (CPU) 201, a switching unit controller 202, a LAN controller 203 and a memory unit 204. The switching unit controller 202 is connected to the calculation controller 123 of the switching unit 10 via the switch unit/computer interface. The LAN controller 203 caries out data communication to the respective terminal units 21a, 21b, 21c and 21d via the LAN 50.

Figure 4:
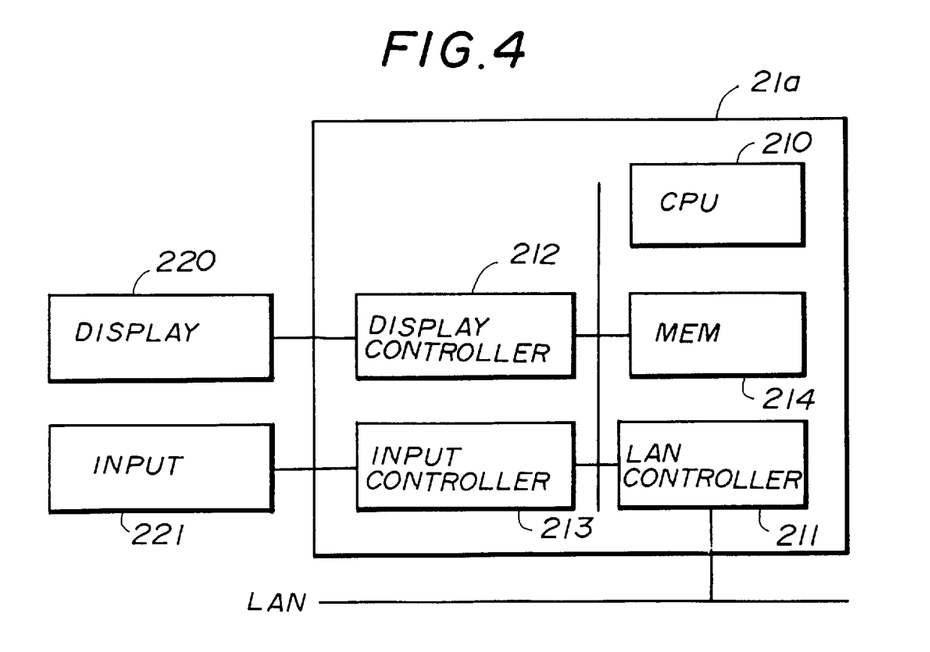
FIG. 4 is a block diagram illustrating each terminal unit provided in the telephone call alerting system shown in FIG. 1

Each terminal unit is formed, for example, as shown in FIG. 4. Referring to FIG. 4, each terminal unit (21a) has a controller (CPU) 210, a LAN controller 211, a display controller 212, an input controller 213 and a memory unit 214. Each terminal unit is connected with a display unit 220 (e.g., a CRT display unit, a LCD display unit or the like), and the display controller 212 controls the display unit 220. An input unit 221, such as a keyboard and a mouse, is connected to the input controller 213, and information input by the input unit 221 is supplied to the input controller 213. The LAN controller 211 carries out data communication to the host unit 20 via the LAN 50.

In the information processing system having the host unit 20 and the terminal units 21a, 21b, 21c and 21d, it is arranged that a user AAA uses the terminal unit 21a, a user BBB uses the terminal unit 21b, a user CCC uses the terminal unit 21c and a user ZZZ uses the terminal unit 21d. The terminal units 21a and 21b are assigned to the telephone terminal 12 connected to the line #1 and the terminal unit 21c is assigned to the telephone terminal 14 connected to the line #2. Further, the terminal unit 21d is assigned to the telephone terminal 16 connected to the line #3. That is, the users AAA and BBB of the terminal units 21a and 21b share the telephone terminal 12, and the telephone terminals 14 and 16 are respectively assigned to the users CCC and ZZZ of the other terminal units 21c and 21d. The telephone numbers "0123" and "0124" for the line #1 are respectively assigned to the terminal units 21a and 21b which are assigned to the telephone terminal 12.

Figure 5:
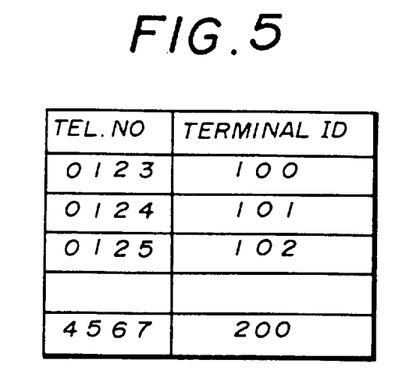
FIG. 5 is a diagram illustrating a table indicating a relationship between telephone numbers and terminal units assigned thereto.

A table indicating a relationship between the telephone numbers assigned to the respective lines and the terminal units, as shown in FIG. 5, is stored in the memory unit 204 of the host unit 20. Referring to FIG. 5, the terminal units 21a, 21b, 21c and 21d are respectively identified by terminal ID numbers "100", "101", "102" and "200".

Figure 6:
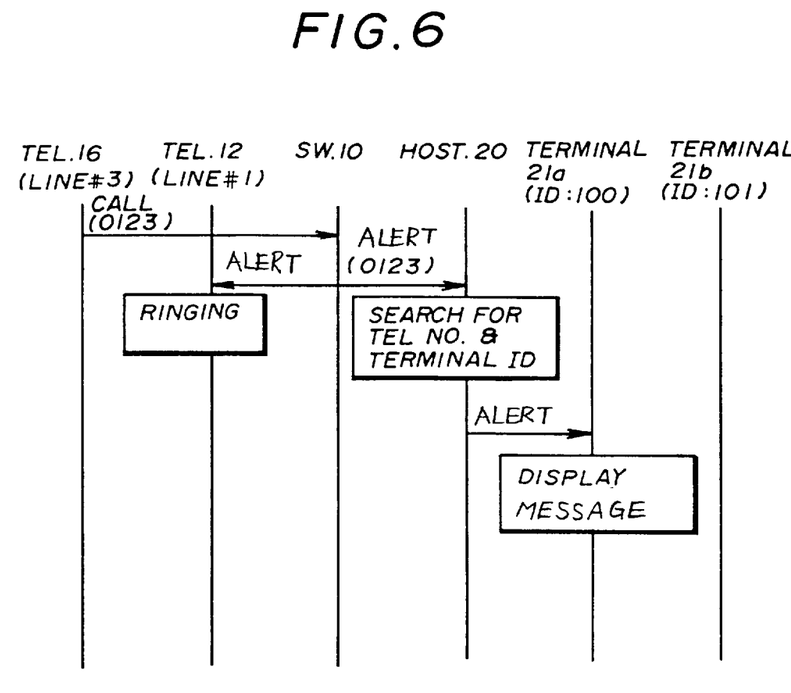
FIG. 6 is a flow chart illustrating an example of a process in the telephone call alerting system.

For example, in a case where the user ZZZ calls the user AAA by the telephone terminal 16, a process is performed in accordance with a procedure as shown in FIG. 6.

Referring to FIG. 6, when the user ZZZ dials a telephone number "0123" on the telephone 16, the telephone number "0123" is transmitted to the switching unit 20 via the line #3. The subscriber circuit 116 connected to the line #3 detects the telephone number "0123". The detected telephone number "0123" is supplied to the controller 121. The controller searches the control table (see Table-1) for a line to which the telephone number "0123" is assigned. In this case, since the telephone number "0123" is assigned to the line #1, the controller 121 controls the switch 110 so that the line #3 and the line #1 are connected to each other. The telephone terminal 12 connected to the line #1 thus rings. At this time, the switch unit 10 supplies to the host unit 20 an alert that a call for the telephone number "0123" has occurred.

In the host unit 20, when the controller 201 receives, via the switching unit controller 202, the alert for the telephone number "0123", the controller 201 searches the table shown in FIG. 5 for a terminal ID number corresponding to the telephone number "0123". In this case, since a terminal ID number "100" corresponds to the telephone number "0123", the controller 201 supplies the alert to the terminal unit 21a identified by the terminal ID number "100" via the LAN controller 203 and the LAN 50.

In the terminal unit 21a, when the controller 210 receives the alert, the controller 210 supplies to the display controller 212 an instruction for displaying a message corresponding to the alert. The display controller 212 outputs a control signal based on the instruction from the controller 212. The display unit 220 receives the control signal from the display controller 212 and displays (outputs) the message that the telephone terminal 12 has received a call. This message is displayed on a predetermined window of the display unit 220.

The user AAA who uses the terminal unit 21a looks at the message and recognizes that the call received by the telephone terminal 12 is for himself (or herself). On the other hand, no message is displayed on the display unit of the terminal unit 21b used by the user BBB who can use the telephone terminal 12. Thus, the user BBB recognizes that the call received by the telephone terminal 12 is not for himself (or herself).

As has been described above, the users AAA and BBB sharing the telephone terminal 12 can determine which user the call received by the telephone terminal 12 is for, based on whether or not the message is displayed on the display unit.

In the telephone call alerting system described above, the information processing system having the host unit 20 and the terminal units 21a, 21b, 21c and 21d is used. However, the present invention is not limited to this structure. A dedicated unit for alerting a user to a telephone call may be provided in the system. In this case, the dedicated unit may output an alerting sound or turn an alerting lamp on to alert a user to the telephone call.

A description will now be given of a second embodiment of the present invention.

In the second embodiment, the hardware of the system is formed as shown in FIGS. 1, 2, 3 and 4 in the same manner as in the first embodiment.

A control table indicating a relationship between lines and telephone numbers assigned thereto is formed as shown in the following Table-2.

TABLE 2

| 0123 | #1 |
|------|----|
| 0124 | #1 |
| 0125 | #1 |
| 0126 | #2 |
| ... |    |
| 4567 | #3 |

The control table is stored in the memory unit 122 of the switching unit 10.

Figure 7:
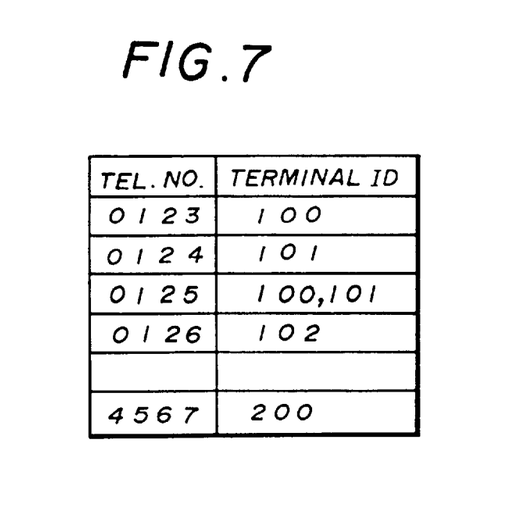
FIG. 7 is a diagram illustrating a table indicating another relationship between telephone numbers and terminal units assigned thereto.

A table indicating a relationship between the telephone numbers and terminal ID numbers is formed as shown in FIG. 7. This table is stored in the memory unit 204 of the host unit 20. In the second embodiment, as shown in the above control table (see Table-2) and the table shown in FIG. 7, three telephone numbers "0123", "0124" and "0125" are assigned to the line #1 and the telephone numbers "0123" and "0124" are respectively assigned to terminal ID numbers "100" and "101". Further, two terminal ID numbers "100" and "101" are assigned to the telephone number "0125".

Figure 8:
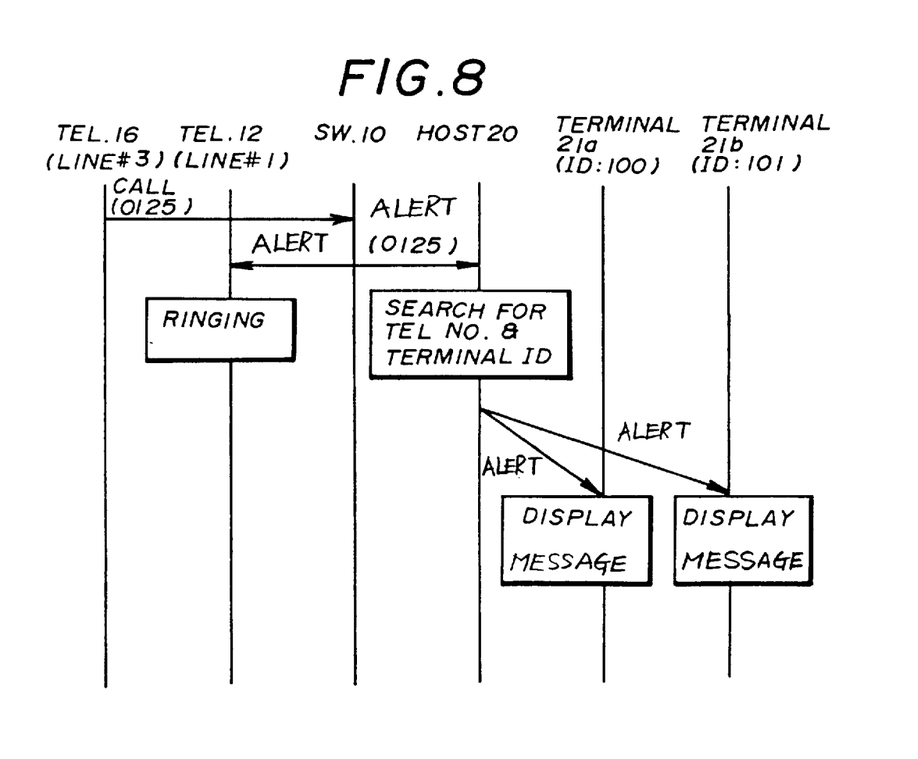
FIG. 8 is a flow chart illustrating an example of a process in the telephone call alerting system.

In this system, when the user ZZZ makes a call for the telephone number "0125" on the telephone terminal 16 connected to the line #3, a process is performed in accordance with a procedure as shown in FIG. 8.

Referring to FIG. 8, first, the switching unit 10 connects the lines #1 and #3 with reference to the control table indicated by the Table-2 in the same manner as in the first embodiment. As a result, the telephone terminal 12 rings. The switching unit 10 supplies to the host unit 20 an alert that a call for the telephone number "0125" has occurred. In the host unit 20, the controller 201 searches the table shown in FIG. 7 for terminal ID numbers assigned to the telephone number "0125". The controller 201 thus detects the terminal ID numbers "100" and "101" corresponding to the telephone number "0125". As a result, the alert from the host unit 20 is sent to both the terminal units 21a and 21b identified by the terminal ID numbers "100" and "101". In each of the terminal units 21a and 21b, a message, corresponding to the alert, that the telephone 12 has received the call is displayed on the display unit in the same manner as in the first embodiment.

Accordingly, the user AAA who uses the terminal unit 21a and the user BBB who uses the terminal unit 21b recognize, based on the message displayed on the display unit, that the call received by the telephone terminal 12 is for themselves. One of the users AAA and BBB who carries out an off-hook operation of the telephone terminal 12 speaks to the user ZZZ on the telephone terminal 12.

A description will now be given of a third embodiment of the present invention.

In the third embodiment, the hardware of the system is formed as shown in FIGS. 1, 2, 3 and 4 in the same manner as in the first embodiment.

Figure 9:
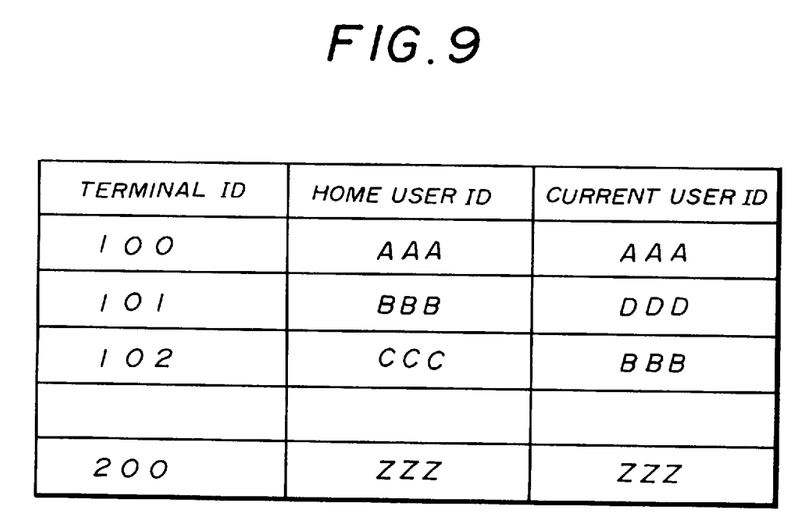
FIG. 9 is a diagram illustrating a table indicating a relationship between terminal units and home users and current users.

A control table indicating a relationship between lines and telephone numbers assigned thereto is formed as shown in Table-1 in the same manner as in the first embodiment. Users who should primarily use (normally use) terminal units are registered as home users for the respective terminal units in the system. A table (referred to as a terminal ID/user management table) indicating a relationship between the terminal units (the terminal ID numbers) and the home users therefor is formed as shown in FIG. 9. The terminal ID/user management table is stored in the memory unit 204 of the host unit 20 together with the table (referred to as a telephone number/terminal ID management table) formed as shown in FIG. 5. In addition, in a log-in operation which is carried out when a user actually uses a terminal unit, an ID number of the user is input as a current user ID number to the terminal unit. The ID number of the user is transmitted from the terminal unit to which the ID number is input as the current user ID number to the host unit 20 via the LAN 50. In the host unit 20, a relationship between each terminal and a corresponding current user ID number is added to the table indicating the relationship between the terminal units and the home users as shown in FIG. 9. Every time a user ID number is input as a current user ID number to a terminal unit, the current user ID number corresponding to the terminal unit in the table is updated.

Figure 10:
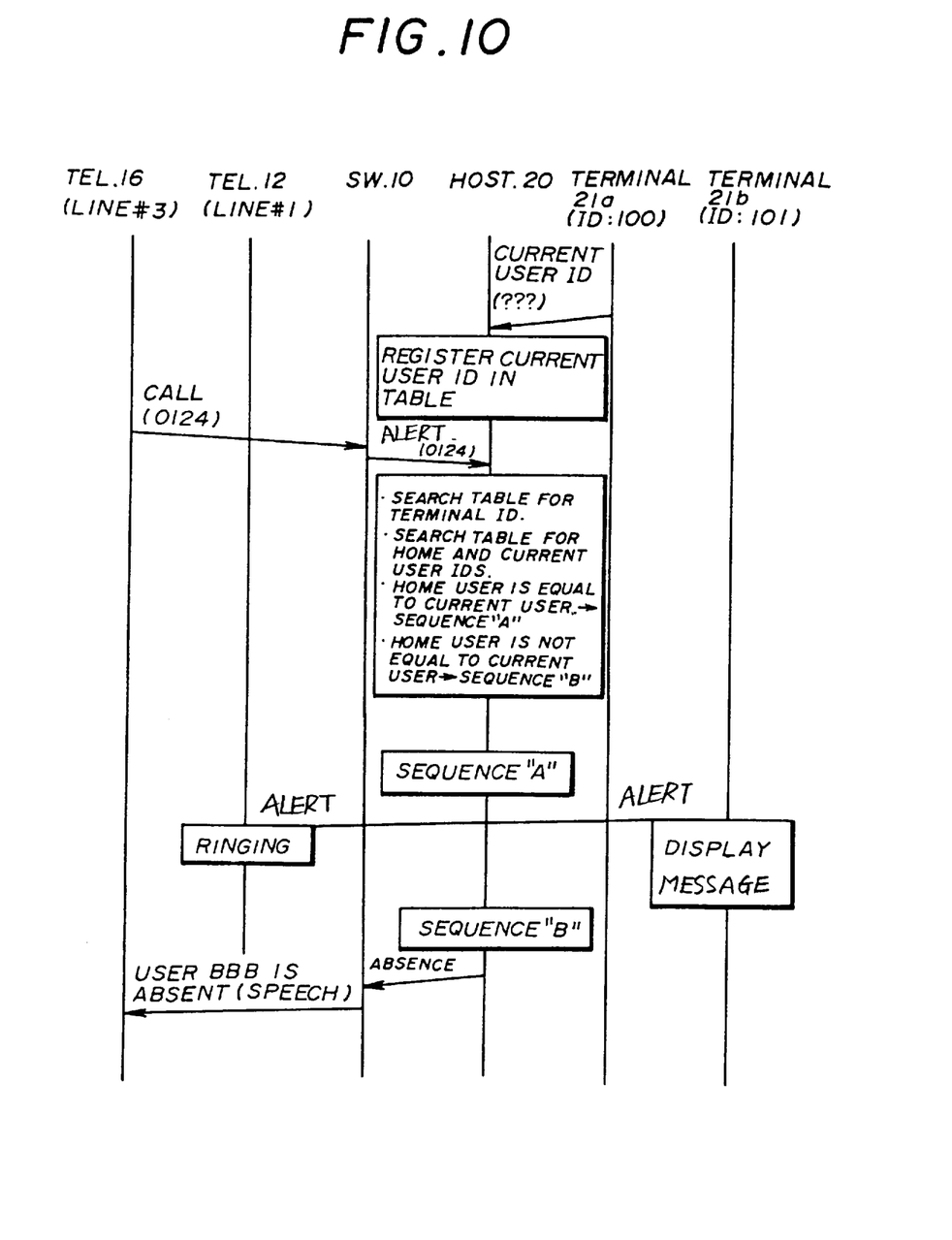
FIG. 10 is a flow chart illustrating an example of a process in the telephone call alerting system.

In the system as has been described above, for example, when the user ZZZ makes a call for the telephone number "0124" on the telephone terminal 16 to call the user BBB who is the home user for the terminal unit 21b (having the ID number "101"), a process is performed in accordance with a procedure as shown in FIG. 10. Referring to FIG. 10, when the switching unit 10 receives a call for the telephone number "0124" from the telephone terminal 16, the switching unit 10 supplies to the host unit 20 information regarding the call for the telephone number "0124". In the host unit 20, the terminal ID number "101" corresponding to the telephone number "0124" is detected with reference to the table (the telephone number/terminal ID table) shown in FIG. 5. Further, it is determined, with reference to the table (the terminal ID/user management table) shown in FIG. 9, whether or not a current user of the terminal unit 21b identified by the terminal ID number "101" is equal to the home user BBB of the terminal unit 21b. In this case, the current user DDD of the terminal unit 21b is not equal to the home user BBB thereof (see FIG. 9). That is, the user BBB, whom the user ZZZ is trying to reach, is not using the terminal 21b. The host unit 20 transmits to the switching unit 10 a response signal indicating that the user BBB is absent (see a sequence B in FIG. 10). The switching unit 10 which receives the response signal from the host unit 20 transmits voice information indicating that the user BBB is absent to the telephone terminal 16 connected to the line #3. In the telephone terminal 16, a message that the user BBB is absent is announced, so that the user ZZZ recognizes it.

On the other hand, if it is determined, in the host unit 20, that a current user of the terminal unit 21b corresponding to the telephone number "0124" is equal to the home user BBB of the terminal unit 21b, a process in a sequence A shown in FIG. 10 is performed. That is, the switching unit 10 connects the line #3 and the line #1 with reference to the control table as indicated in Table-1 so that the telephone terminal 12 rings. In addition, an alert that a call is received by the telephone terminal 12 is supplied from the host unit 20 to the terminal unit 21b. As a result, a message corresponding to the alert is displayed on the display unit of the terminal unit 21b in the same manner as in the first embodiment. The user BBB using the terminal unit 21b looks at the message on the display unit and recognizes that the call received by the telephone terminal 12 is for himself (or herself).

A description will now be given of a fourth embodiment of the present invention. In the fourth embodiment, the hardware structure of the system is formed as shown in FIGS. 1, 2, 3 and 4 in the same manner as in the first embodiment. The control table indicating the relationship between the lines and the telephone numbers as shown in Table-1 is formed in the same manner as in the first embodiment. Further, the table (the telephone number/terminal ID table) indicating the relationship between the telephone numbers and the terminal units as shown in FIG. 5 and the table indicating the relationship among the terminal units, the home user ID numbers and the current user ID numbers as shown in FIG. 9 are stored in the memory unit 204 of the host unit 20 in the same manner as in the third embodiment.

In this system, for example, the user ZZZ makes a call for the telephone number "0124" on the telephone terminal 16 connected to the line #3 in order to call the user BBB who is the home user of the terminal unit 21b. In this case, a process is performed in a procedure as shown in FIG. 11.

Figure 11:
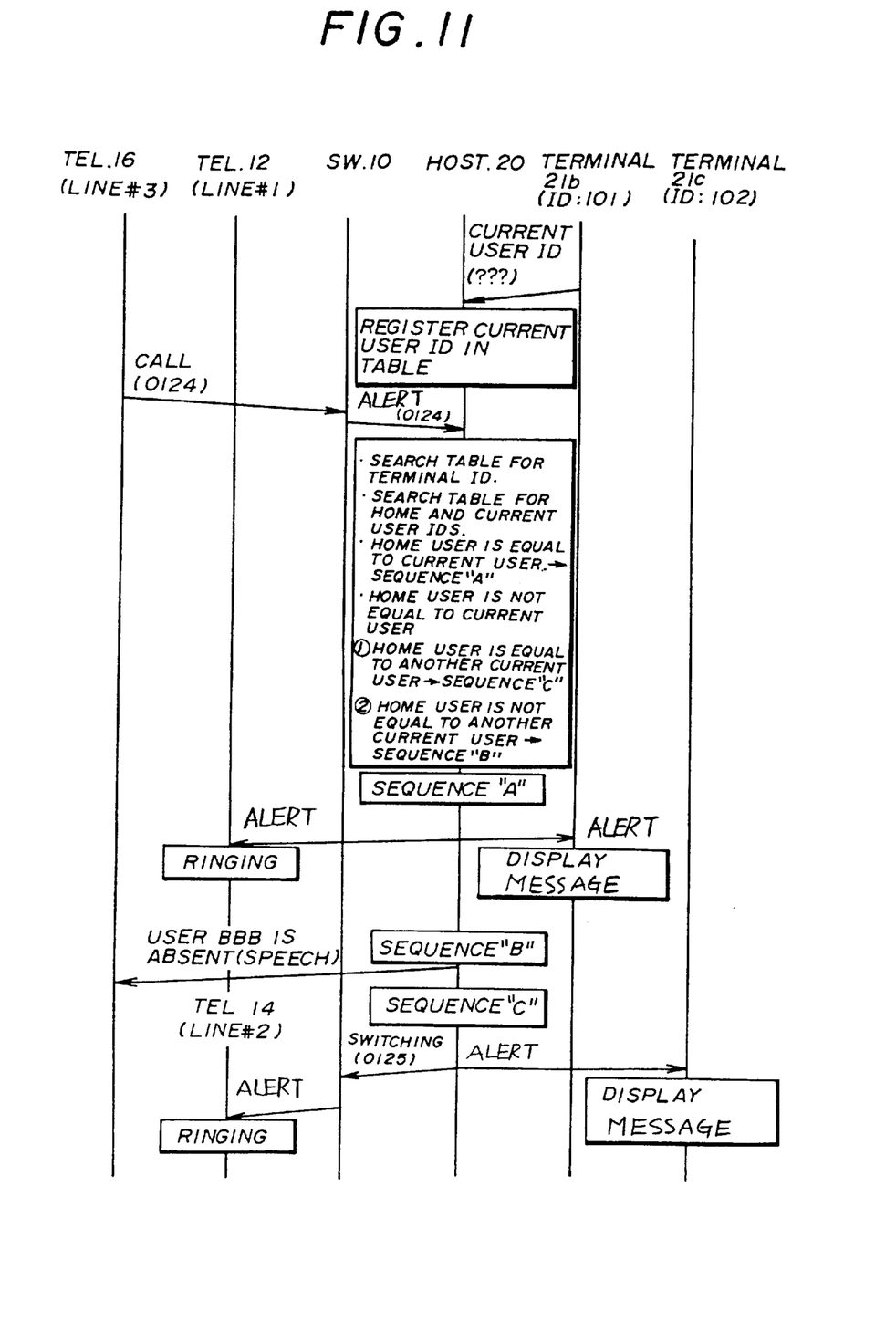
FIG. 11 is a flow chart illustrating an example of a process in the telephone call alerting system.

Referring to FIG. 11, first, it is determined, in the host unit 20, whether or not the current user of the terminal unit 21b (identified by the terminal ID number "101") corresponding to the telephone number "0124" is equal to the home user of the terminal unit 21b, in the same manner as in the third embodiment. In this case, the current user is not equal to the home user (see FIG. 9). Thus, the host unit 20 further checks, with reference to the table shown in FIG. 9, whether or not there is a terminal unit used by the user BBB who is the home user of the terminal unit 21b. The host unit 20 detects that the user BBB is using the terminal unit 21c identified by the terminal ID number "102" (the user BBB is registered as the current user of the terminal unit 21c in the table shown see FIG. 9). As a result, the host unit 20 detects the telephone number "0125" corresponding to the terminal unit 21c (the terminal ID number "102") with reference to the table shown in FIG. 5. The host unit 20 supplies to the switching unit 10 an instruction for connecting the line #3 to the line #2 corresponding to the telephone number "0125" (in the sequence C shown in FIG. 11). The switching unit 10 thus connects the line #3 connected to the calling telephone terminal 16 to the line #2. As a result, the telephone terminal 14 connected to the line #2 rings. In addition, at this time, the host unit 20 transmits to the terminal unit 21c an alert that a call has occurred. A message corresponding to the alert is displayed on the display unit of the terminal unit 21c used by the user BBB. The user BBB who temporarily uses the terminal unit 21c looks at the message and recognizes that the call received by the telephone terminal 14 is for himself (or herself).

When the current user of the terminal unit 21b is equal to the home user, the alert is displayed on the display unit of the terminal unit 21b and the telephone terminal 12 rings, in the same manner as in the third embodiment (in the sequence A shown in FIG. 11). Further, in a case where the user BBB who is the home user of the terminal unit 21b is not registered as the current user in the table shown in FIG. 9, that is, in a case where the user BBB does not perform the log-in operation on any terminal unit, a message that the user BBB is absent is announced in the telephone terminal 16 (in the sequence B shown in FIG. 11).

A description will now be given of a fifth embodiment of the present invention.

In the fifth embodiment, the hardware of the system is formed as shown in FIGS. 1, 2, 3 and 4 in the same manner as in the first embodiment. The control table indicating the relationship between the lines and the telephone numbers assigned thereto as indicated in Table-1 is stored in the memory unit 122 of the switching unit 10, in the same manner as in the first, third and fourth embodiments. The table indicating the relationship between telephone numbers and the terminal units as shown in FIG. 5 is stored in the memory unit 204 of the host unit 20 in the same manner as in the above respective embodiments.

Figure 12:
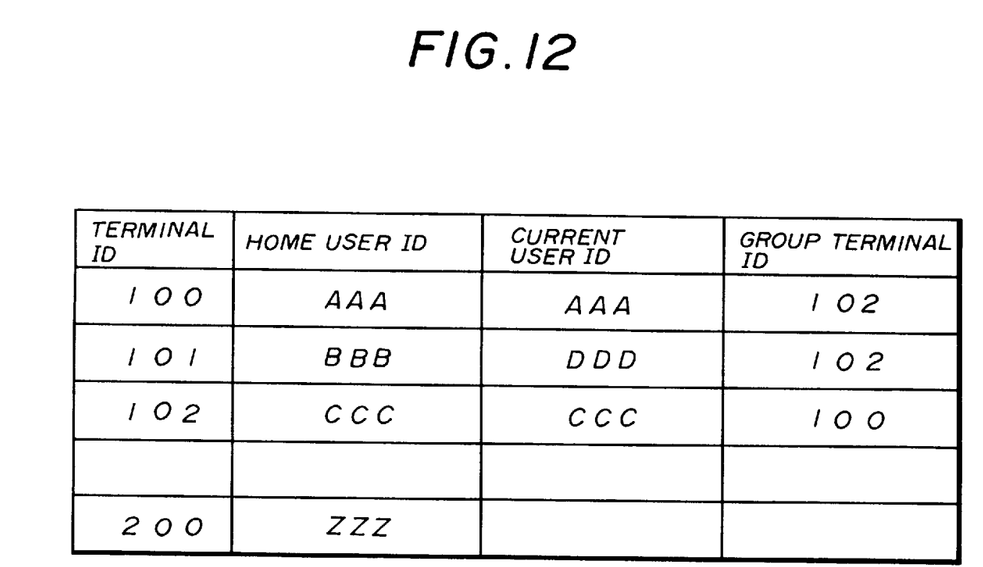
FIG. 12 is a diagram illustrating a table indicating a relationship among terminal units, home users, current users and grouped terminal units.

In the fifth embodiment, a table as shown in FIG. 12 is stored in the memory unit 204 of the host unit 20. The table indicates the relationship among the terminal units, the home users and the current users. The table further indicates a relationship between the respective users (the home users) and the terminal ID numbers identifying the terminal units which should be used by representative users. In the table shown in FIG. 12, for example, the user AAA corresponds to the terminal ID number 102 identifying the terminal unit 21c which should be used by the user CCC. The user CCC is a representative of the user AAA.

In the system, for example, the user ZZZ makes a call for the telephone number "0124" on the telephone terminal 16 connected to the line #3 to call the user BBB who is the home user of the terminal unit 21b. In this case, a process is performed in accordance with a procedure as shown in FIG. 13.

Figure 13:
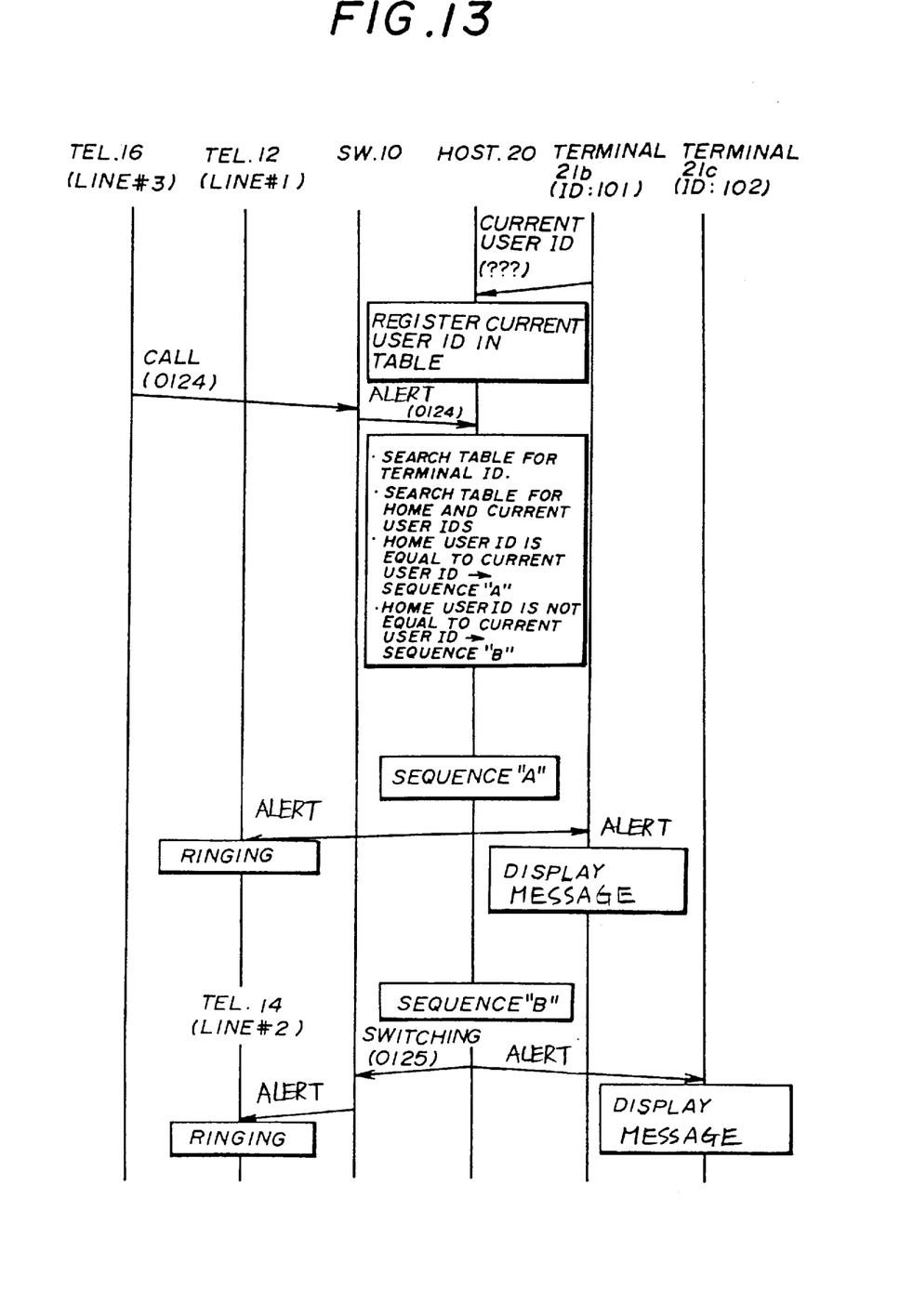
FIG. 13 is a flow chart illustrating an example of a process in the telephone call alerting system.

Referring to FIG. 13, first, it is determined, in the host unit 20, whether the current user of the terminal unit 21b (identified by the terminal ID number "101") corresponding to the telephone number "0124" is equal to the home user of the terminal unit 21b, in the same manner as in the fourth embodiment. In this case, the current user of the terminal unit 21b is not equal to the home user (see FIG. 12). The host unit 20 further checks whether or not a terminal unit which should be used by a representative of the user BBB is registered in the table shown in FIG. 12. In this case, the user CCC is the representative of the user BBB, and the terminal unit 21c identified by the group terminal ID number "102" is registered as the group terminal unit for the user BBB in the table shown in FIG. 12. As a result, the host unit 20 searches the table shown in FIG. 5 for the telephone number "0125" corresponding to the terminal ID number "102" identifying the terminal unit 21c. The host unit 20 then supplies to the switching unit 10 an instruction for connecting the line #3 to the line #2 corresponding to the telephone number "0125" (in the sequence B shown in FIG. 13). The switching unit 10 thus connects the line #3 to the line #2 in accordance with the instruction from the host unit 20. As a result, the telephone terminal 14 connected to the line #2 rings. At this time, the host unit 20 supplies to the terminal unit 21c (identified by the terminal ID number "102") an alert that a call has occurred. A message corresponding to the alert is displayed on the display unit of the terminal unit 21c used by the user CCC. The user CCC recognizes, based on the message displayed on the display unit, that the call received by the telephone terminal 14 is for himself (or herself). As a result, even if the user BBB is absent at the terminal unit 21b, the user ZZZ can be speak to the user CCC who is the representative of the user BBB on the telephone terminal 16.

When the current user of the terminal unit 21b corresponding to the telephone number "0124" is equal to the home user of the terminal unit 21b, the telephone terminal 12 identified by the telephone number "0124" rings and the message corresponding to the alert that the call is received by the telephone terminal 12 is displayed on the display unit of the terminal unit 21b, in the same manner as in the above respective embodiments (in the sequence A shown in FIG. 13).

The present invention is not limited to the aforementioned embodiments, and variations and modifications may be made without departing from the scope of the claimed invention.

What is claimed is:

1. A telephone call alerting system applied to a telephone communication system accommodating a line to which a telephone terminal is connected, a plurality of telephone numbers being assigned to the line, said telephone call alerting system comprising:

output means for outputting information indicating a telephone number of a call when the call is received by said telephone terminal;

a plurality of informing units for outputting an alert indicating that a call has been received by said telephone terminal, each of said plurality of informing units corresponding to one of said plurality of telephone numbers;

table storage means for storing a table indicating a relationship between said plurality of telephone numbers and said plurality of informing units;

identification means, when the call is received by said telephone terminal, for identifying one of said plurality of informing units corresponding to the telephone number indicated by the information output by said output means, with reference to said table stored in said table storage means; and control means, when the call is received by said telephone terminal, for supplying an instruction of outputting the alert to said one of said plurality of informing units identified by said identification means, so that said one of said plurality of informing units outputs the alert.

2. The telephone call alerting system as claimed in claim 1, wherein the relationship indicated by said table includes a relationship in which a single telephone number corresponds to a plurality of informing units, and wherein, when said identification means identifies said plurality of information units corresponding to the single telephone number with reference to said table, said control means supplies the instruction of outputting the alert to said plurality of informing units.

3. The telephone call alerting system as claimed in claim 1 further comprising:

an information processing system having a host and a plurality of terminal units connected to said host, wherein said each of said plurality of informing units is provided in one of said terminal units, and said table storage means, said identification means and said control means are provided in said host.

4. The telephone call alerting system as claimed in claim 1, wherein said telephone communication system has a switching unit accommodating the line to which said plurality of telephone numbers are assigned, and wherein said output means is provided in said switching unit.

5. A telephone call alerting system applied to a telephone communication system accommodating a plurality of lines to each of which a telephone terminal is connected, and using an information processing system having a host and terminal units connected to said host, each of said terminal units being assigned to one of telephone numbers assigned to said plurality of lines including at least one line to which a plurality of telephone numbers are assigned, said telephone call alerting system comprising:

output means for outputting information indicating a telephone number of a call when the call is received by a telephone terminal;

table storage means for storing a first table indicating a relationship between the telephone numbers and the terminal units and a second table indicating a relationship between said terminal units and users who normally use said terminal units;

current-user setting means for setting information indicating users who currently use said terminal units;

identification means for identifying a terminal unit corresponding to the telephone number indicated by the information output by said output means with reference to said first table stored in said table storage means;

user determination means, when the call is received by said telephone terminal, for determining, based on said second table stored in said table storage means and information set by said current-user setting means, whether or not a current user of said terminal unit identified by said identification means is a user who normally uses said terminal unit;

first control means, when said user determination unit determines that the current user of said terminal unit identified by said identification means is the user who normally uses said terminal, for supplying to said terminal unit an instruction of outputting an alert indicating that the call has been received by said telephone terminal.

6. The telephone call alerting system as claimed in claim 5, wherein said table storage means, said current user setting means, said identification means, said user determination means and said first control means are provided in said host of said information processing system.

7. The telephone call alerting system as claimed in claim 5, wherein information indicating a user which information is input to a terminal unit by a log-in operation is supplied, as the information indicating the user who currently uses the terminal unit, to said current user-setting means.

8. The telephone call alerting system as claimed in claim 5 further comprising:

returning means, when said user determination means determines that the current user of said terminal unit identified by said identification means is not the user who normally uses said terminal unit, for returning information to a calling telephone terminal via said telephone communication system, the information indicating that the user who normally uses said terminal unit is absent from said terminal unit.

9. The telephone call alerting system as claimed in claim 5 further comprising:

terminal determination means, when said user determination means determines that the current user of said terminal unit identified by said identification means is not the user who normally uses said terminal unit, for determining, with reference to the information set by said current user setting means, whether or not the user who normally uses said terminal unit is using another terminal unit;

second control means, when said terminal determination means determines that the user who normally uses said terminal unit is using said another terminal unit, for supplying to said another terminal unit an instruction of outputting an alert indicating that the call has been received by said telephone terminal.

10. The telephone call alerting system as claimed in claim 9 further comprising:

line switching control means, when a line corresponding to a telephone number to which said another terminal unit is assigned is not equal to a line connected to said telephone terminal which has received the call, for supplying to said telephone communication system an instruction indicating that a line which should receive the call is switched from the line connected to said telephone terminal which has received the call to the line corresponding to the telephone number to which said another terminal unit is assigned.

11. The telephone call alerting system as claimed in claim 5, wherein a third table indicating a relationship between users and terminal units which are normally used by representative users of said users is stored in said table storage means, said telephone call alerting system further comprising:

second control means, when said user determination means determines that the current user of said terminal unit identified by said identification means is not the user who normally uses said terminal unit, for supplying an instruction of outputting an alert indicating that the call is received by said telephone terminal to said terminal unit which is normally used by a representative user of the user, with reference to said second table and said third table stored in said table storage means.

12. The telephone call alerting system as claimed in claim 11 further comprising:

line switching control means, when the line corresponding to a telephone number to which said terminal unit receiving the instruction from said second control means is assigned is not equal to the line connected to said telephone terminal which has received the call, for supplying to said telephone communication system an instruction indicating that a line which should receive the call is switched from the line connected to said telephone terminal which has received the call to the line corresponding to the telephone number to which said terminal unit receiving the instruction from said second control means is assigned.

13. The telephone call alerting system as claimed in claim 5, wherein said telephone communication system has a switching unit which accommodates said plurality of lines, and wherein said output means is provided in said switching unit.

14. An information processing system used in a telephone call alerting system applied to a telephone communication system accommodating a plurality of lines to which telephone terminals are connected, said telephone call alerting system having output means for outputting information indicating a telephone number of a call when the call is received by a telephone terminal, said information processing system comprising:

a host; and terminal units connected to said host, each of said terminal units being assigned to one of the telephone numbers assigned to said plurality of lines, wherein said host has:

table storage means for storing a table indicating a relationship between the telephone numbers and said terminal units;

identification means for receiving the information indicating the telephone number from said output means of said telephone call alerting system and for identifying a terminal unit corresponding to the telephone number indicated by the information with reference to said table stored in said table storage means; and control means, when a call is received by the telephone terminal, for supplying to said terminal unit identified by said identification means an instruction of outputting an alert indicating that the call has been received by the telephone terminal.

15. The information processing system as claimed in claim 14, wherein the relationship indicated by said table includes a relationship in which a single telephone number corresponds to a plurality of terminal units, and wherein, when said identification means identifies said plurality of terminal units corresponding to the single telephone number with reference to said table, said control means supplies the instruction of outputting the alert to said plurality of terminal units.

16. An information processing system used in a telephone call alerting system applied to a telephone communication system accommodating a plurality of lines to which telephone terminals are connected, said telephone call alerting system having output means for outputting information indicating a telephone number of a call when the call is received by a telephone terminal, said information processing system comprising:

a host; and terminal units connected to said host, each of said terminal units being assigned to one of the telephone numbers assigned to said plurality of lines, wherein said host has:

table storage means for storing a first table indicating a relationship between the telephone numbers and the terminal units and a second table indicating a relationship between said terminal units and users who normally use said terminal units;

current-user setting means for setting information indicating users who currently use said terminal units;

identification means for identifying a terminal unit corresponding to the telephone number indicated by the information output by said output means with reference to said first table stored in said table storage means;

user determination means, when the call is received by said telephone terminal, for determining, based on said second table stored in said table storage means and the information set by said current-user setting means, whether or not a current user of said terminal unit identified by said identification means is a user who normally uses said terminal unit;

first control means, when said user determination unit determines that the current user of said terminal unit identified by said identification means is the user who normally uses said terminal, for supplying to said terminal unit an instruction of outputting an alert indicating that the call has been received by said telephone terminal.

17. The information processing system as claimed in claim 16, wherein information indicating a user which information is input to a terminal unit by a log-in operation is supplied, as the information indicating the user who currently uses the terminal unit, to said current-user setting means.

18. The information processing system as claimed in claim 16, wherein said host further has:

returning means, when said user determination means determines that the current user of said terminal unit identified by said identification means is not the user who normally uses said terminal unit, for returning information to said telephone communication system, the information indicating that the user who normally uses said terminal unit is absent from said terminal unit.

19. The information processing system as claimed in claim 16, wherein said host further has:

terminal determination means, when said user determination means determines that the current user of said terminal unit identified by said identification means is not the user who normally uses said terminal unit, for determining, with reference to the information set by said current-user setting means, whether or not the user who normally uses said terminal unit is using another terminal unit;

second control means, when said terminal determination means determines that the user who normally uses said terminal unit is using said another terminal unit, for supplying to said another terminal unit an instruction of outputting an alert indicating that the call has been received by said telephone terminal.

20. The information processing system as claimed in claim 19, wherein said host further has:

line switching control means, when a line corresponding to a telephone number to which said another terminal unit is assigned is not equal to a line connected to said telephone terminal which has received the call, for supplying to said telephone communication system an instruction indicating that a line which should receive the call is switched from the line connected to said telephone terminal which has received the call to the line corresponding to the telephone number to which said another terminal unit is assigned.

21. The information processing system as claimed in claim 16, wherein a third table indicating a relationship between users and terminal units which are normally used by representative users of said users is stored in said table storage means, said host further comprising:

second control means, when said user determination means determines that the current user of said terminal unit identified by said identification means is not the user who normally uses said terminal unit, for supplying an instruction of outputting an alert indicating that the call is received by said telephone terminal to said terminal unit which is normally used by a representative user of the user, with reference to said second table and said third table stored in said table storage means.

22. The information processing system as claimed in claim 21, wherein said host further has:

line switching control means, when the line corresponding to a telephone number to which said terminal unit receiving the instruction from said second control means is assigned is not equal to the line connected to said telephone terminal which has received the call, for supplying to said telephone communication system an instruction indicating that a line which should receive the call is switched from the line connected to said telephone terminal which has received the call to the line corresponding to the telephone number to which said terminal unit receiving the instruction from said second control means is assigned.

23. A telephone call alerting system applied to a telephone communication system accommodating a plurality of lines to each of which a telephone terminal is connected, and using an information processing system having a host and terminal units connected to said host, each of said terminal units being assigned to one of a plurality of telephone numbers assigned to said plurality of lines including at least one line to which a plurality of telephone numbers are assigned, said telephone call alerting system comprising:

a table storage unit to store a first table indicating a relationship between the telephone numbers and the terminal units, and a second table indicating a relationship between said terminal units and users who normally use said terminal units;

a current-user setting unit to set information indicating users who currently use said terminal units;

an identification unit to identify a terminal unit corresponding to a dialed telephone number; and a user determination unit, when the call is received by said telephone terminal, to determine based on said second table stored in said table storage unit, and the information set by said current-user setting unit, whether a current user of said terminal unit identified by said identification unit is a user who normally uses said terminal unit.

\* \* \* \* \*